United States Patent
Sawai et al.

(10) Patent No.: US 8,002,223 B2
(45) Date of Patent: *Aug. 23, 2011

(54) DISPLAY SUPPORT MECHANISM

(75) Inventors: Kunio Sawai, Daito (JP); Katsuyuki Yokota, Daito (JP)

(73) Assignee: Funai Electric Co, Ltd., Daito-shi (JP)

( * ) Notice: Subject to any disclaimer, the term of this patent is extended or adjusted under 35 U.S.C. 154(b) by 1194 days.

This patent is subject to a terminal disclaimer.

(21) Appl. No.: 11/656,381

(22) Filed: Jan. 23, 2007

(65) Prior Publication Data

US 2007/0215760 A1    Sep. 20, 2007

(30) Foreign Application Priority Data

Jan. 23, 2006    (JP) .................................. 2006-013305

(51) Int. Cl.
*A47G 23/02* (2006.01)
(52) U.S. Cl. .......... 248/146; 248/917; 248/919; 16/277; 16/297
(58) Field of Classification Search .................. 248/146, 248/159, 291.1, 292.14, 284.1, 917, 919, 248/920, 921, 922, 923; 16/277, 297, 303, 16/319, 333, 334, 374, 375, 376, 377
See application file for complete search history.

(56) References Cited

U.S. PATENT DOCUMENTS

| | | | | |
|---|---|---|---|---|
| 553,650 | A * | 1/1896 | Kingsland ..................... 403/353 |
| 2,498,557 | A * | 2/1950 | Lantz ............................... 108/33 |
| 2,498,558 | A * | 2/1950 | Lantz ............................... 108/33 |
| 4,940,175 | A * | 7/1990 | Tittel ............................... 224/324 |
| 4,953,259 | A * | 9/1990 | Frye et al. ........................ 16/225 |
| 5,022,778 | A * | 6/1991 | Lu ..................................... 403/120 |
| 5,109,570 | A * | 5/1992 | Okada et al. ..................... 16/289 |
| 5,208,944 | A * | 5/1993 | Lu ..................................... 16/278 |
| 5,239,731 | A * | 8/1993 | Lu ..................................... 16/340 |
| 5,289,616 | A * | 3/1994 | Taniyama ....................... 16/376 |
| 5,316,373 | A * | 5/1994 | Markel ..................... 297/411.32 |
| 5,645,308 | A * | 7/1997 | Fink .............................. 296/97.9 |
| 5,812,368 | A * | 9/1998 | Chen et al. ............... 361/679.06 |
| 5,894,633 | A * | 4/1999 | Kaneko ........................... 16/306 |
| 5,913,351 | A * | 6/1999 | Miura ............................. 16/340 |
| 6,018,847 | A * | 2/2000 | Lu ................................... 16/337 |

(Continued)

FOREIGN PATENT DOCUMENTS

JP    2000-200048 A    7/2000

(Continued)

OTHER PUBLICATIONS

Chinese Office Action dated Feb. 12, 2010 including English translation (Eleven (11) pages).

(Continued)

*Primary Examiner* — Kimberly T Wood
(74) *Attorney, Agent, or Firm* — Crowell & Moring LLP

(57) ABSTRACT

This display support mechanism comprises a support shaft provided in the form of a plate, a display screen support member, having a first hole receiving the platelike support shaft, provided on the side of a display screen and a base support member, having a second hole receiving the platelike support shaft, provided on the side of a base, and at least either the first hole or the second hole receiving the platelike support shaft is provided in the form of a sector while the display screen support member is rotatable about the platelike support shaft serving as an axis of rotation in the angular range of the sector.

17 Claims, 10 Drawing Sheets

U.S. PATENT DOCUMENTS

| | | | |
|---|---|---|---|
| 6,421,878 B1 * | 7/2002 | Kaneko et al. | 16/330 |
| 6,453,509 B1 * | 9/2002 | Shin | 16/340 |
| 6,671,928 B2 * | 1/2004 | Huang | 16/340 |
| 6,757,940 B2 * | 7/2004 | Lu et al. | 16/330 |
| 6,779,234 B1 | 8/2004 | Lu et al. | |
| 6,813,813 B2 * | 11/2004 | Lu et al. | 16/342 |
| 6,918,159 B2 * | 7/2005 | Choi | 16/347 |
| 7,337,496 B2 * | 3/2008 | Cho et al. | 16/236 |
| 7,516,925 B2 * | 4/2009 | Sawai et al. | 248/146 |
| 7,636,984 B2 * | 12/2009 | Oh | 16/374 |
| 2002/0083554 A1 | 7/2002 | Lu | |
| 2003/0122046 A1 | 7/2003 | Huong | |
| 2005/0268431 A1 | 12/2005 | Lo | |

FOREIGN PATENT DOCUMENTS

| | | |
|---|---|---|
| JP | 3106183 U | 10/2004 |
| JP | 3111702 U | 6/2005 |

OTHER PUBLICATIONS

The Extended European Search Report dated Jul. 27, 2009 (Six (6) pages).

\* cited by examiner

DISPLAY SUPPORT MECHANISM

BACKGROUND OF THE INVENTION

1. Field of the Invention

The present invention relates to a display support mechanism, and more particularly, it relates to a display support mechanism capable of supporting a display screen in a state inclined by a prescribed angle.

2. Description of the Background Art

A display support mechanism capable of supporting a display screen in a state inclined by a prescribed angle is known in general, as disclosed in Japanese Patent Laying-Open No. 2000-200048 and Japanese Utility Model registration Nos. 3106183 and 3111702, for example. Each of the patent documents such as the aforementioned Japanese Patent Laying-Open No. 2000-200048 discloses a support structure for a display screen employing a round shaft as an axis of rotation for inclining the display screen by a prescribed angle with respect to a base.

In the structure employing the round shaft as the axis of rotation for inclining the display screen by a prescribed angle disclosed in each of the patent documents such as the aforementioned Japanese Patent Laying-Open No. 2000-200048, however, grooving or the like must be performed along the outer periphery of the round shaft for mounting a stop member such as a C-ring in order to prevent the round shaft from axial deviation, to disadvantageously result in complicated working of the axis of rotation.

SUMMARY OF THE INVENTION

The present invention has been proposed in order to solve the aforementioned problem, and an object of the present invention is to provide a display support mechanism capable of inclining a display screen by a prescribed angle without employing a round shaft as an axis of rotation.

A display support mechanism according to a first aspect of the present invention comprises a support shaft provided in the form of a plate, a display screen support member, having a first hole receiving the platelike support shaft, provided on the side of a display screen and a base support member, having a second hole receiving the platelike support shaft, provided on the side of a base, and at least either the first hole or the second hole receiving the platelike support shaft is provided in the form of a sector while the display screen support member is rotatable about the platelike support shaft serving as an axis of rotation in the angular range of the sector.

As hereinabove described, the display support mechanism according to the first aspect is provided with the platelike support shaft and the display screen support member is rendered rotatable about the platelike support shaft serving as the axis of rotation, so that the platelike support shaft can be employed as the axis of rotation. Thus, the display screen can be inclined by a prescribed angle without employing a round shaft as the axis of rotation. In this case, the platelike support shaft is so easily borable or shapable that no complicated working of the axis of rotation is required dissimilarly to a case of performing grooving or the like along the outer peripheral surface of a round shaft. Further, at least either the first hole or the second hole receiving the platelike support shaft is provided in the form of the sector while the display screen support member is rendered rotatable about the platelike support shaft serving as the axis of rotation in the angular range of the sector, whereby the rotatable angular range of the display screen support member can be regulated through the sectoral first or second hole without separately providing a member for regulating the angular range.

In the aforementioned display support mechanism according to the first aspect, either the first hole or the second hole is preferably provided in the form of the sector while either the second hole or the first hole is preferably provided in the form of a rectangle for regulating rotation of the platelike support shaft. According to this structure, the platelike support shaft remains unsliding with respect to the display screen support member when the first hole thereof is provided in the form of a rectangle and remains unsliding with respect to the base support member when the second hole thereof is provided in the form of a rectangle, to be inhibited from abrasion resulting from sliding.

In the aforementioned display support mechanism according to the first aspect, the bottom of the sector preferably receives the vertical load of the display screen through the display screen support member. According to this structure, the display screen support member can be easily rotated about the bottom of the sector.

In this case, the length of the bottom is preferably substantially equalized to the thickness of the support shaft. According to this structure, the support shaft can be inhibited from positionally deviating from the bottom of the sector when the display screen support member is rotated about the bottom of the sector. Thus, rotation of the display screen support member can be stabilized.

In the aforementioned structure having the bottom of the sector receiving the vertical load of the display screen through the display screen support member, the radial length of the sector is preferably larger than the length of a side of the support shaft corresponding to the radial width of the sector when at least either the first hole or the second hole is provided in the form of the sector. According to this structure, the support shaft can be inhibited from coming into contact with an arcuate side of the sector when rotated about the bottom of the sector, whereby rotation of the display screen support member can be stabilized.

The aforementioned display support mechanism according to the first aspect preferably further comprises a spring member for pressing the display screen support member and the base support member to be rotatable about the platelike support shaft serving as the axis of rotation and a stop member for inhibiting the platelike support shaft from coming off the display screen support member and the base support member through the pressing force of the spring member. According to this structure, the display screen support member (display screen) can be supported in a state inclined by a prescribed angle with respect to the base support member (base) through the pressing force of the spring member. Thus, the operation for inclining the display screen support member (display screen) can be inhibited from complication dissimilarly to a case of fixing the display screen to the base by tightening a screw while inclining the display screen by a prescribed angle. Further, the stop member can easily hold a state of pressing the display screen support member and the base support member with the spring member.

In this case, the spring member may include a plate spring.

In the aforementioned structure comprising the stop member, the display support mechanism preferably further comprises a plate member inserted into the platelike support shaft and arranged between the display screen support member or the base support member and the stop member. According to this structure, the stop member remains unsliding with respect to the display screen support member or the base support member, to be inhibited from abrasion.

In the aforementioned structure of the display support mechanism comprising the spring member and the stop member, the stop member is preferably provided in the form of a plate and receives the pressing force of the spring member on an end surface in a direction perpendicular to the thickness direction. According to this structure, the stop member can receive the pressing force of the spring member with the strong end surface in the direction perpendicular to the thickness direction, to be inhibited from bending resulting from the pressing force of the spring member.

In the aforementioned structure of the display support mechanism comprising the spring member and the stop member, the stop member can preferably control the pressing force of the spring member pressing the display screen support member and the base support member against each other. According to this structure, the force necessary for rotating the display screen support member (display screen) with respect to the base support member (base) against the pressing force of the spring member can be easily controlled.

The aforementioned display support mechanism according to the first aspect preferably further comprises a friction member for increasing frictional force between the display screen support member and the base support member. According to this structure, the force necessary for rotating the display screen support member (display screen) with respect to the base support member (base) can be increased, thereby inhibiting the display screen from moving with respect to the base through weak force.

In this case, the friction member is preferably arranged to annularly enclose the support shaft. According to this structure, frictional force can be applied between the display screen support member and the base support member to be along the rotational direction around the support shaft serving as the center of rotation. Thus, rotation of the display screen support member can be stabilized with respect to the base support member.

In the aforementioned display support mechanism according to the first aspect, the support shaft is preferably made of sheet metal. According to this structure, the support shaft can easily support the heavy display screen. Further, the support shaft of sheet metal, easily borable or shapable by press working, can be easily worked.

A display support mechanism according to a second aspect of the present invention comprises a display screen support member provided on the side of a display screen and a base support member provided on the side of a base, and further comprises a support shaft provided in the form of a plate, a spring member for pressing the display screen support member and the base support member to be rotatable about the platelike support shaft serving as an axis of rotation, a stop member for inhibiting the platelike support shaft from coming off the display screen support member and the base support member through the pressing force of the spring member, a plate member inserted into the platelike support shaft and arranged between the display screen support member and the stop member and a friction member for increasing frictional force between the display screen support member and the base support member, while the display screen support member includes a first hole provided in the form of a sector for receiving the platelike support shaft and is rotatable about the platelike support shaft serving as an axis of rotation in the angular range of the sector, the base support member includes a second hole, receiving the platelike support shaft, provided in the form of a rectangle for regulating rotation of the platelike support shaft, the bottom of the sector receives the vertical load of the display screen through the display screen support member, and the stop member is provided in the form of a plate, receives the pressing force of the spring member on an end surface in a direction perpendicular to the thickness direction and can control the pressing force of the spring member pressing the display screen support member and the base support member against each other.

As hereinabove described, the display support mechanism according to the second aspect is provided with the platelike support shaft and the display screen support member is rendered rotatable about the platelike support shaft serving as the axis of rotation, so that the platelike support shaft can be employed as the axis of rotation. Thus, the display screen can be inclined by a prescribed angle without employing a round shaft as the axis of rotation. In this case, the platelike support shaft is so easily borable or shapable that no complicated working of the axis of rotation is required dissimilarly to a case of performing grooving or the like along the outer peripheral surface of a round shaft. Further, the first hole of the display screen support member receiving the platelike support shaft is provided in the form of the sector while the display screen support member is rendered rotatable about the platelike support shaft serving as the axis of rotation in the angular range of the sector, whereby the rotatable angular range of the display screen support member can be regulated through the sectoral first hole without separately providing a member for regulating the angular range. In addition, the first hole of the display screen support member is provided in the form of the sector while the second hole of the base support member is provided in the form of the rectangle for regulating rotation of the platelike support shaft, whereby the platelike support shaft remains unsliding with respect to the base support member, to be inhibited from abrasion resulting from sliding. Further, the bottom of the sector receives the vertical load of the display screen through the display screen support member, whereby the display screen support member can be easily rotated about the bottom of the sector. Further, the spring member is provided for pressing the display screen support member and the base support member to be rotatable about the platelike support shaft serving as the axis of rotation, whereby the display screen support member (display screen) can be supported in a state inclined by a prescribed angle with respect to the base support member (base) through the pressing force of the spring member. Thus, the operation for inclining the display screen support member (display screen) can be inhibited from complication dissimilarly to a case of fixing the display screen to the base by tightening a screw while inclining the display screen by a prescribed angle.

According to the second aspect, further, the display support mechanism is provided with the stop member for inhibiting the platelike support shaft from coming off the display screen support member and the base support member, so that the stop member can easily hold a state of pressing the display screen support member and the base support member with the spring member. The display support mechanism is further provided with the plate member inserted into the platelike support shaft and arranged between the display screen support member and the stop member, whereby the stop member remains unsliding with respect to the display screen support member, to be inhibited from abrasion. Further, the stop member is provided in the form of the plate and receives the pressing force of the spring member on the end surface in the direction perpendicular to the thickness direction, whereby the stop member can receive the pressing force of the spring member with the strong end surface in the direction perpendicular to the thickness direction, to be inhibited from bending resulting from the pressing force of the spring member. In addition, the stop member can control the pressing force of the spring member pressing the display screen support member and the base support member against each other, whereby the force necessary for rotating the display screen support member (display screen) with respect to the base support member (base) against the pressing force of the spring member can be easily controlled. Further, the display support mechanism is provided with the friction member for increasing the frictional force between the display screen support member and the base support member so that the force necessary for rotating the display screen support member (display screen) with respect to the base support member (base) can be increased, thereby inhibiting the display screen from moving with respect to the base through weak force.

In the aforementioned display support mechanism according to the second aspect, the length of the bottom is preferably substantially equalized to the thickness of the support shaft. According to this structure, the support shaft can be inhibited from positionally deviating from the bottom of the sector when the display screen support member is rotated about the bottom of the sector. Thus, rotation of the display screen support member can be stabilized.

In the aforementioned display support mechanism according to the second aspect, the radial length of the sectoral first hole is preferably larger than the length of a side of the support shaft corresponding to the radial width of the first hole. According to this structure, the support shaft can be inhibited from coming into contact with an arcuate side of the first hole when rotated about the bottom of the first hole, whereby rotation of the display screen support member can be stabilized.

In the aforementioned display support mechanism according to the second aspect, the spring member may include a plate spring.

In the aforementioned display support mechanism according to the second aspect, the friction member is preferably arranged to annularly enclose the support shaft. According to this structure, frictional force can be applied between the display screen support member and the base support member to be along the rotational direction around the support shaft serving as the center of rotation. Thus, rotation of the display screen support member can be stabilized with respect to the base support member.

In the aforementioned display support mechanism according to the second aspect, the support shaft is preferably made of sheet metal. According to this structure, the support shaft can easily support the heavy display screen. Further, the support shaft of sheet metal, easily borable or shapable by press working, can be easily worked.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a display support mechanism 1 according to the embodiment of the present invention is described with reference to FIGS. 1 to 11.

Figure 1:
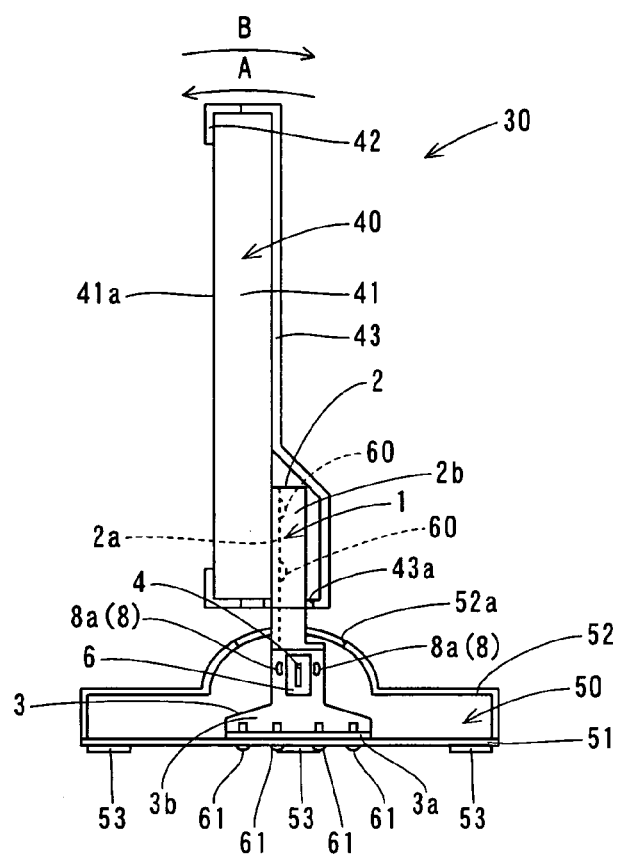
FIG. 1 is a side elevational view showing the overall structure of a liquid crystal display provided with a display support mechanism according to an embodiment of the present invention.
Figure 2:
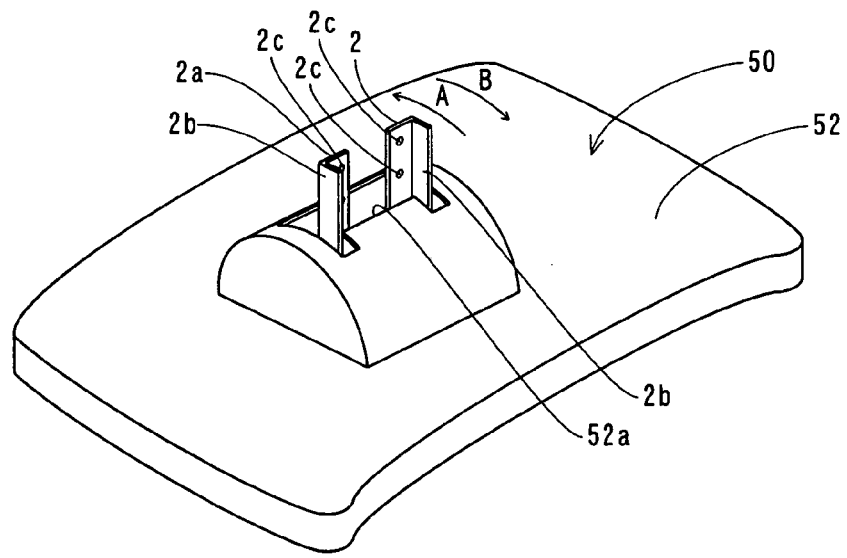
FIG. 2 is a perspective view of the display support mechanism according to the embodiment shown in FIG. 1, from which a liquid crystal display portion is removed.

The display support mechanism 1 according to the embodiment of the present invention is provided for supporting a liquid crystal display portion 40 of a liquid crystal display 30, as shown in FIG. 1. This display support mechanism 1 is mounted on a base 50. The display support mechanism 1 supports the liquid crystal display portion 40 to be rotatable in directions A and B with respect to the base 50, as shown in FIGS. 1 and 2. The display support mechanism 1 is enabled to support the liquid crystal display portion 40 in a state inclined by a prescribed angle with respect to the base 50.

Figure 3:
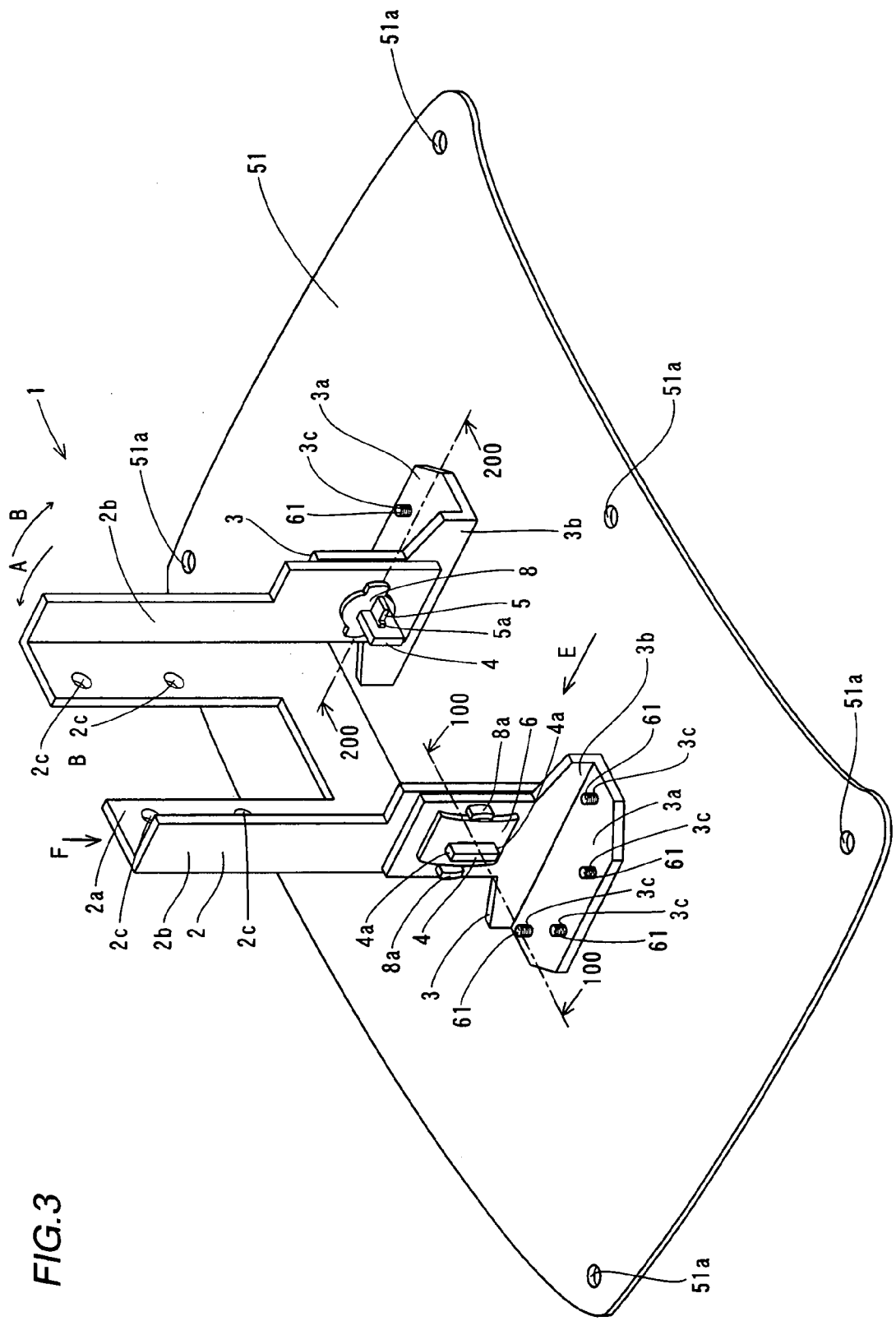
FIG. 3 is a perspective view showing the overall structure of the display support mechanism according to the embodiment shown in FIG. 1.
Figure 4:
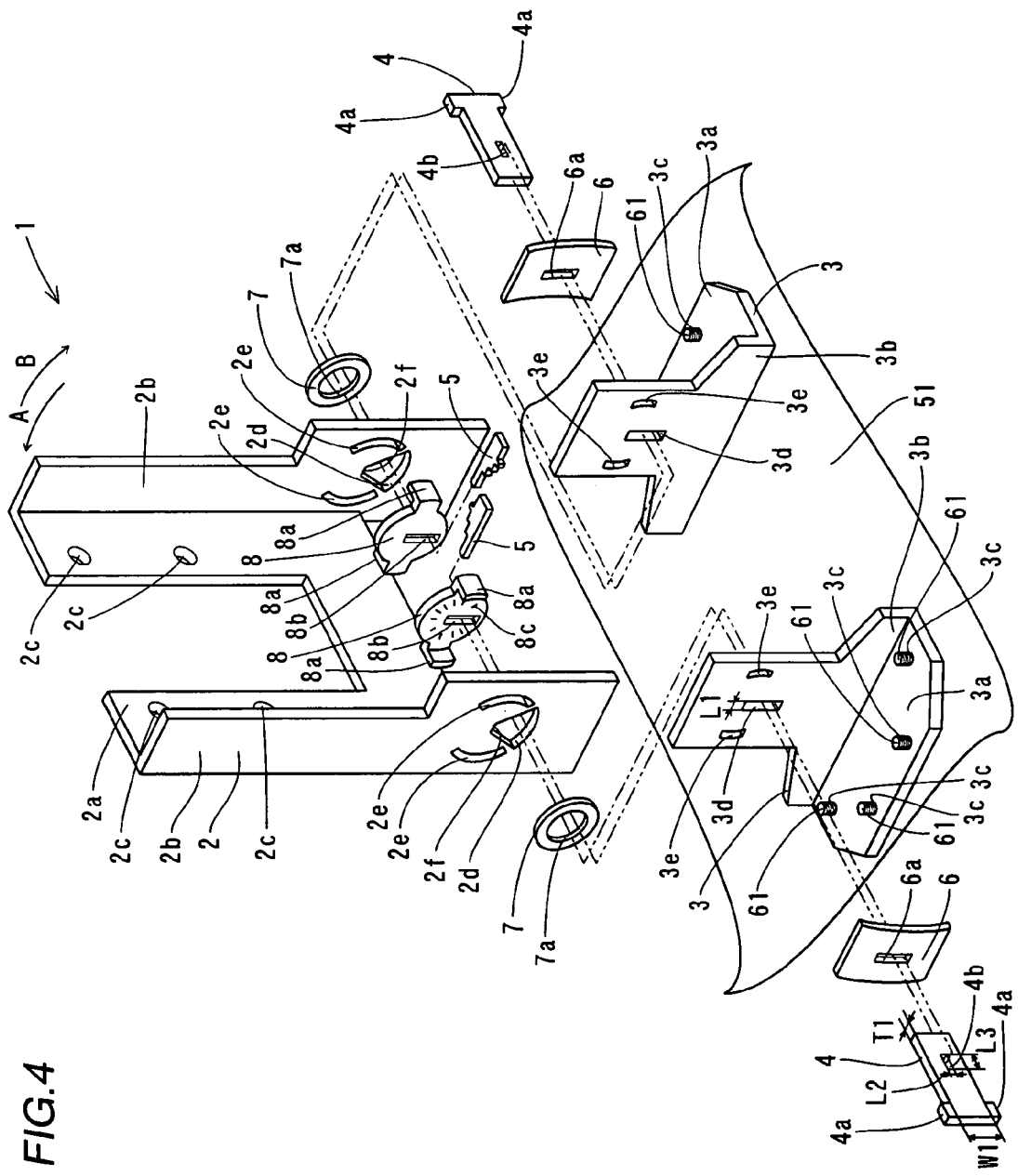
FIG. 4 is an exploded perspective view showing the overall structure of the display support mechanism according to the embodiment shown in FIG. 3.

As shown in FIGS. 3 and 4, the display support mechanism 1 comprises a liquid crystal display portion support member 2, a pair of base support members 3, platelike support shafts 4 of sheet metal, stop members 5 of sheet metal, plate springs 6, friction members 7 and pressure-contact plates 8 of sheet metal.

According to this embodiment, the liquid crystal display portion support member 2 includes a display mounting portion 2a and a pair of rotational portions 2b, as shown in FIGS. 3 and 4. The display mounting portion 2a of the liquid crystal display portion support member 2 is provided with four screw receiving holes 2c. The pair of rotational portions 2b of the liquid crystal display portion support member 2 are so provided as to extend from both side ends of the display mounting portion 2a perpendicularly to the surface thereof respectively. As shown in FIG. 4, sectoral holes 2d and pairs of arcuate holes 2e are provided in the vicinity of the lower ends of the pair of rotational portions 2b respectively. The liquid crystal display portion support member 2 is an example of the "display screen support member" in the present invention. The holes 2d are examples of the "first hole" in the present invention.

Figure 8:
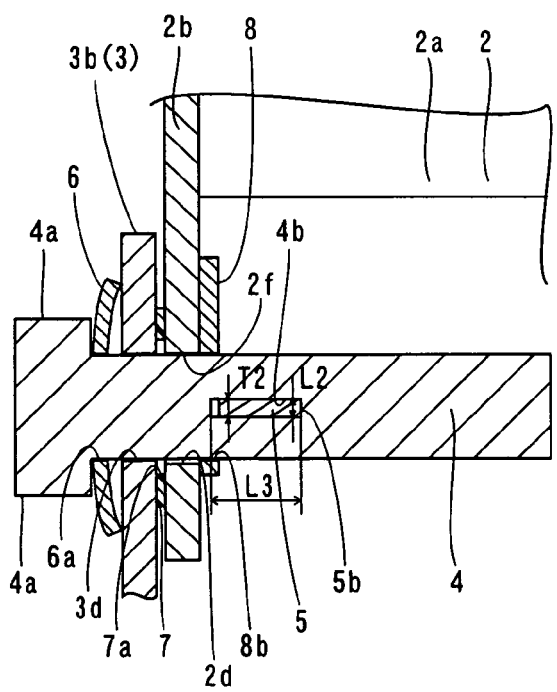
FIG. 8 is a sectional view taken along the line 100-100 in FIG. 3.
Figure 11:
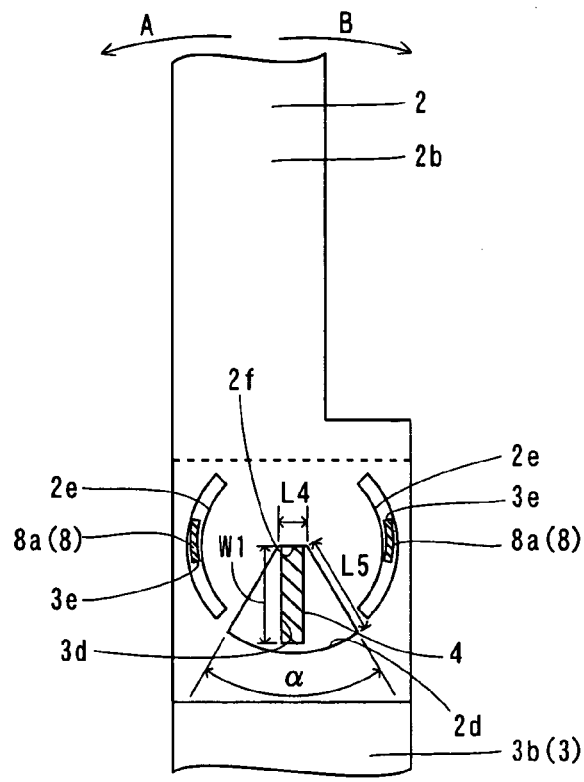
FIG. 11 is a sectional view taken along the line 200-200 in FIG. 3.

The sectoral holes 2d are provided for receiving the platelike support shafts 4, as shown in FIGS. 4 and 8. Each sectoral hole 2d has a central angle α of about 60° and is so arranged as to direct a bottom portion 2f thereof upward, as shown in FIG. 11. The length L4 of the bottom portions 2f of the sectoral holes 2d is substantially identical to the thickness T1 (see FIG. 4) of the support shafts 4, as described later. Thus, the bottom portions 2f of the sectoral holes 2d receive the vertical load of the liquid crystal display portion 40 through the liquid crystal display portion support member 2. The liquid crystal display portion support member 2 is rendered rotatable about the bottom portions 2f of the sectoral holes 2d supported by the platelike support shafts 4 in a sectoral angular range (about 60° according to this embodiment). In other words, the platelike support shafts 4 function as the axes of rotation of the liquid crystal display portion support member 2. The radial length L5 of each hole 2d is larger than the width W1 of the corresponding platelike support shaft 4, as shown in FIG. 11.

Each pair of arcuate holes 2e are provided for receiving engaging sections 8a of the corresponding pressure-contact plate 8 as described later, as shown in FIG. 11. The pair of arcuate holes 2e are arranged on a circle around the bottom portion 2f of the sectoral hole 2d.

According to this embodiment, the pair of base support members 3 include base mounting portions 3a and rotational portion mounting portions 3b respectively, as shown in FIGS. 3 and 4. Four screw mounting holes 3c are provided on the base mounting portion 3a of each base support member 3. The rotational portion mounting portions 3b of the base support members 3 are so provided as to vertically extend upward from first ends of the surfaces of the base mounting portions 3a. These rotational portion mounting portions 3b are provided with rectangular holes 3d and pairs of arcuate holes 3e smaller in arcuate length than the pairs of arcuate holes 2e of the display mounting portions 2b of the liquid crystal display portion support member 2. The holes 3d are examples of the "second hole" in the present invention.

The rectangular holes 3d are provided for receiving the platelike support shafts 4, as shown in FIGS. 4 and 8. The short-directional length L1 of the rectangular holes 3d is substantially identical to the thickness T1 (see FIG. 4) of the support shafts 4, as described later. Thus, the rectangular holes 3d have functions of regulating rotation of the support shafts 4. The pairs of arcuate holes 3e are provided for engaging with the engaging sections 8a of the pressure-contact plates 8, as described later. Further, the pairs of arcuate holes 3e are arranged on circles around the upper ends of the rectangular holes 3d respectively.

Figure 7:
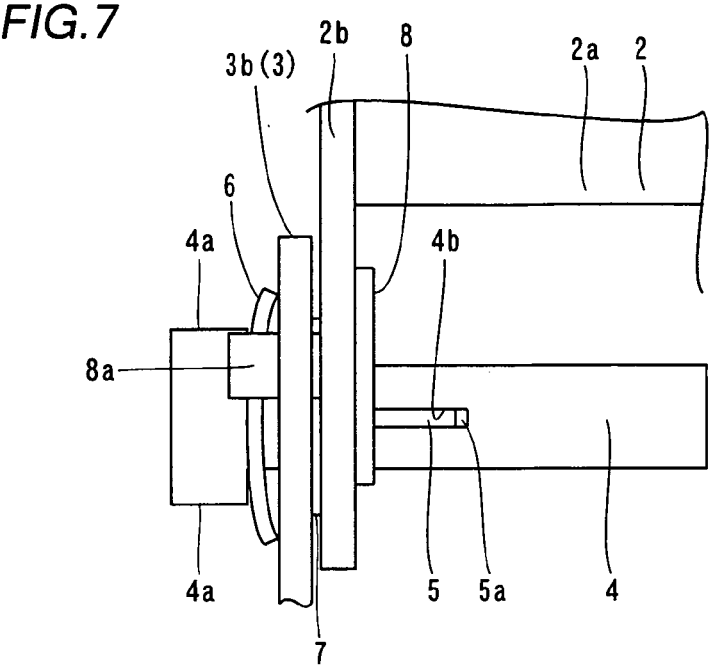
FIG. 7 partially illustrates the display support mechanism as viewed along arrow E in FIG. 3.

According to this embodiment, the platelike support shafts 4 of sheet metal include pairs of contact portions 4a and rectangular holes 4b respectively, as shown in FIGS. 3 and 4. The pairs of contact portions 4a of the support shafts 4 are protrusively provided on rear ends of longitudinally extending side surfaces of the support shafts 4 respectively. Each contact portion 4a is provided for coming into contact with the corresponding plate spring 6, as shown in FIGS. 7 and 8. The rectangular hole 4b of each support shaft 4 is provided for receiving the corresponding stop member 5, as shown in FIGS. 4 and 8. The short-directional length L2 of the rectangular holes 4b is substantially identical to the thickness T2 (see FIG. 5) of the stop members 5, as described later. The holes 4b have a longitudinal length L3.

Figure 5:
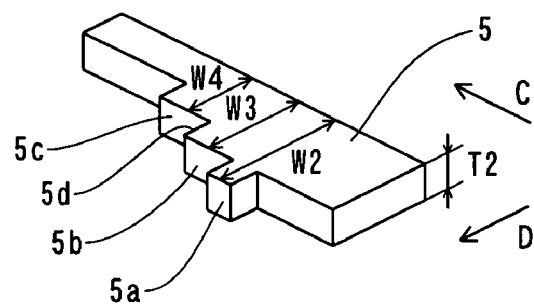
FIG. 5 is a perspective view showing a stop member of the display support mechanism according to the embodiment shown in FIG. 3.

According to this embodiment, each stop member 5 of sheet metal is provided in the form of a plate and includes a contact portion 5a and engaging portions 5b and 5c on a first side surface extending in the longitudinal direction, as shown in FIGS. 3 to 5. The stop members 5 are provided for inhibiting the platelike support shafts 4 from coming off the sectoral holes 2d of the liquid crystal display portion support member 2 and the rectangular holes 3d of the base support member 3 through the pressing force of the plate springs 6. The contact portion 5a of each stop member 5 is provided in a direction D (perpendicular to the thickness direction) perpendicular to an insertional direction C, as shown in FIG. 5. A portion of each stop member 5 corresponding to the contact portion 5a has a width W2 (see FIG. 5) larger than the longitudinal length L3 (see FIG. 4) of the holes 4b of the support shafts 4. This contact portion 5a is provided for coming into contact with the surface of the corresponding support shaft 4 thereby inhibiting the stop member 5 from coming off the hole 4b of the corresponding support shaft 4 when inserted into the hole 4b.

Figure 9:
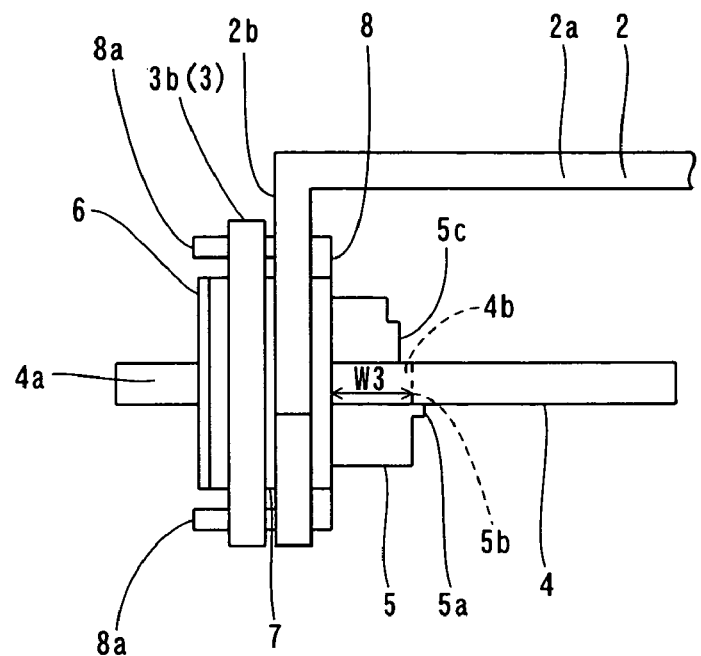
FIGS. 9 and 10 partially illustrate the display support mechanism as viewed along arrow F in FIG. 3.
Figure 10:
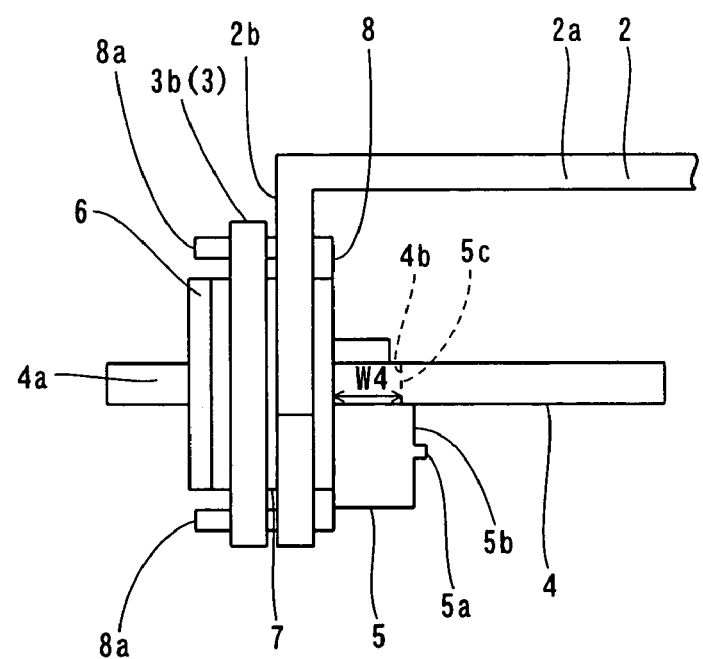

The engaging portions 5b and 5c of each stop member 5 are enabled to receive and control the pressing force of the corresponding plate spring 6 pressing the liquid crystal display portion support member 2 and the corresponding base support member 3. More specifically, the engaging portion 5b of each stop member 5 is provided adjacently to the contact portion 5a, as shown in FIG. 5. The engaging portion 5c of the stop member 5 is adjacent to the engaging portion 5b through a step 5d. A portion of the stop member 5 corresponding to the engaging portion 5b has a width W3 smaller than the width W2 of the portion corresponding to the contact portion 5a as well as the longitudinal length L3 (see FIG. 4) of the hole 4b of the corresponding support shaft 4. A portion of the stop member 5 corresponding to the engaging portion 5c has a width W4 smaller than the width W3 of the portion corresponding to the engaging portion 5b as well as the longitudinal length L3 (see FIG. 4) of the hole 4b of the corresponding support shaft 4. When the engaging portion 5c is arranged in the hole 4b of the corresponding support shaft 4 as shown in FIG. 10, therefore, the distance between the corresponding base support member 3 and the contact portion 4a of the support shaft 4 is increased by the length (=W3−W4) of the step 5d of the stop member 5 as compared with a case where the engaging portion 5b is arranged in the hole 4b of the corresponding support shaft 4 as shown in FIG. 9. Thus, the pressing force of the corresponding plate spring 6 pressing the liquid crystal display portion support member 2 and the corresponding base support member 3 can be reduced when the engaging portion 5c is arranged in the hole 4b of the corresponding support shaft 4, as compared with the case where the engaging portion 5b is arranged in the hole 4b of the corresponding support shaft 4. The plate spring 6 presses the liquid crystal display portion support member 2 and the corresponding base support member 3 with such pressing force that the liquid crystal display portion support member 2 is rotatable about the corresponding support shaft 4 serving as an axis of rotation and supportable at a prescribed angle of inclination with respect to the corresponding base support member 3.

According to this embodiment, the plate springs 6 are made of stainless steel and have rectangular holes 6a, as shown in FIGS. 3 and 4. These plate springs 6 have functions of pressing the liquid crystal display portion support member 2 and the base support members 3 to be rotatable about the platelike support shafts 4 serving as axes of rotation. The rectangular holes 6a of the plate springs 6 are provided for receiving the support shafts 4, as shown in FIGS. 4 and 8. The plate springs 6 are examples of the "spring member" in the present invention.

According to this embodiment, the friction members 7 are made of felt or vinyl chloride and provided in the form of circles, as shown in FIG. 4. These friction members 7 are so arranged as to annularly enclose the support shafts 4, as shown in FIGS. 4 and 8. Further, the friction members 7 are provided with circular holes 7a, to be capable of receiving the support shafts 4. The friction members 7 are provided for increasing the frictional force between the liquid crystal display portion support member 2 and the base support members 3.

Figure 6:
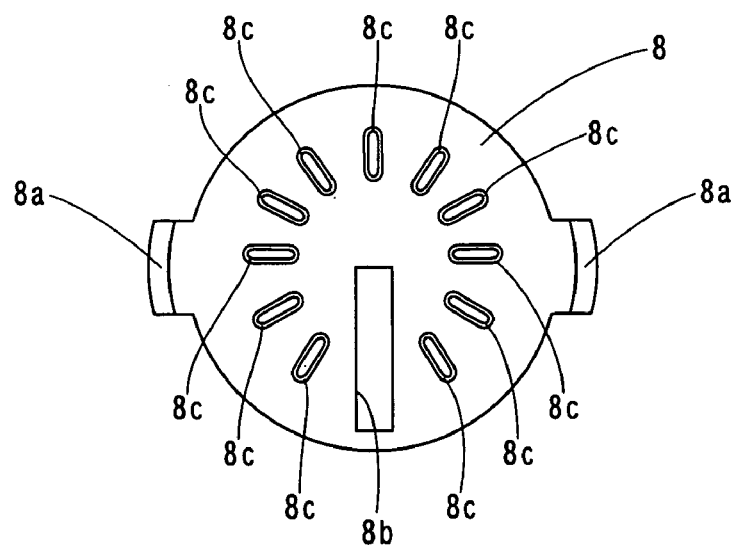
FIG. 6 is a plan view showing a pressure-contact plate of the display support mechanism according to the embodiment shown in FIG. 3.

According to this embodiment, the pressure-contact plates 8 of sheet metal are provided in the form of circles and include pairs of engaging sections 8a, rectangular holes 8b and a plurality of projecting portions 8c, as shown in FIGS. 3, 4 and 6. These pressure-contact plates 8 are arranged between the liquid crystal display portion support member 2 and the stop members 5. The pairs of engaging sections 8a of the pressure-contact plates 8 are so provided as to perpendicularly extend from ends of the surfaces of the pressure-contact plates 8. The rectangular holes 8b of the pressure-contact plates 8 are provided for receiving the support shafts 4, as shown in FIGS. 4 and 8. The short-directional length of the rectangular holes 8b is substantially identical to the thickness T1 (see FIG. 4) of the support shafts 4, while the longitudinal length of the rectangular holes 8b is substantially identical to the width W1 (see FIG. 4) of the support shafts 4. The plurality of projecting portions 8c of the pressure-contact plates 8 are provided on the surfaces having the protruding engaging sections 8a for increasing the frictional force between the liquid crystal display portion support member 2 and the pressure-contact plates 8. The pressure-contact plates 8 are examples of the "plate member" in the present invention.

The liquid crystal display portion 40 includes a liquid crystal module 41 including a liquid crystal screen 41a, a front cabinet 42 and a rear cabinet 43, as shown in FIG. 1. The liquid crystal module 41 of the liquid crystal display portion 40 is mounted on the liquid crystal display portion support member 2 by fastening screws 60 to screw mounting holes (not shown) through the screw receiving holes 2c of the liquid crystal display portion support member 2. The rear cabinet 43 is provided with a notch 43a for receiving the liquid crystal display portion support member 2. The liquid crystal display portion 40 is an example of the "display screen" in the present invention.

The base 50 includes a base body 51, a cover member 52 and support legs 53, as shown in FIGS. 1 to 3. The base support members 3 are mounted on the base body 51 of the base 50 by fastening screws 61 to the screw mounting holes 3c of the base support members 3 through screw receiving holes (not shown) of the base body 51 from the side of the bottom surface. The cover member 52 of the base 50 is mounted on the base body 51 by fastening screws (not shown) to screw mounting holes (not shown) of the cover member 52 through screw receiving holes 51a of the base body 51 from the side of the bottom surface. The cover member 52 is provided with a notch 52a for receiving the liquid crystal display portion support member 2. The support legs 53 are mounted on the bottom surface of the base body 51.

Rotating operations of the display support mechanism 1 according to this embodiment are now described with reference to FIGS. 1 and 11 to 13.

Figure 12:
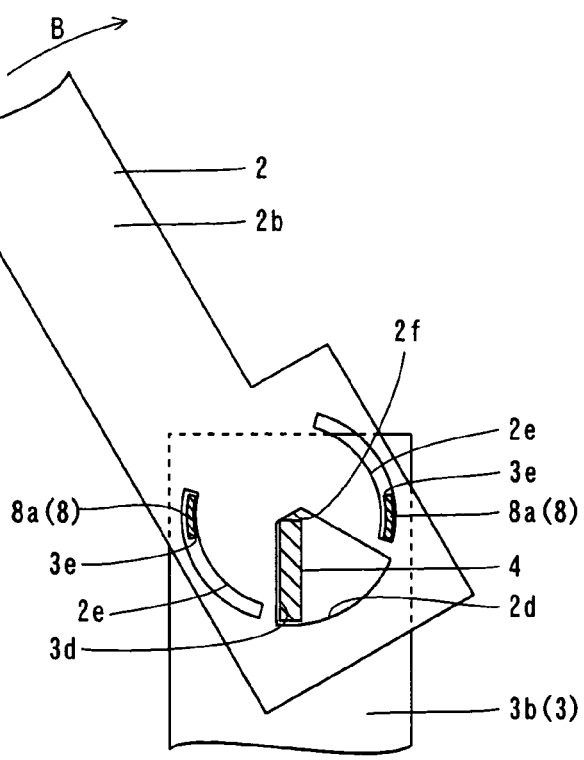
FIGS. 12 and 13 are sectional views for illustrating rotating operations of the display support mechanism according to the embodiment shown in FIG. 3.

In order to incline the liquid crystal display portion support member 2 frontward, the liquid crystal display portion 40 (see FIG. 1) supported by the liquid crystal display portion support member 2 is grasped and pressed in the direction A from the state upright with respect to the base support members 3 as shown in FIG. 11. Thus, the liquid crystal display portion support member 2 is rotated in the direction A about the bottom portion 2f of each sectoral hole 2d, as shown in FIG. 12. The liquid crystal display portion support member 2 is pressed and rotated in the direction A up to a prescribed angle of inclination, to be supported by the base support members 3 at this angle of inclination. According to this embodiment, the liquid crystal display portion support member 2 is rotatable (inclinable) up to an angle of inclination of 30° in the direction A so that each support shaft 4 comes into contact with a first end surface of the corresponding sectoral hole 2d, as shown in FIG. 12.

Figure 13:
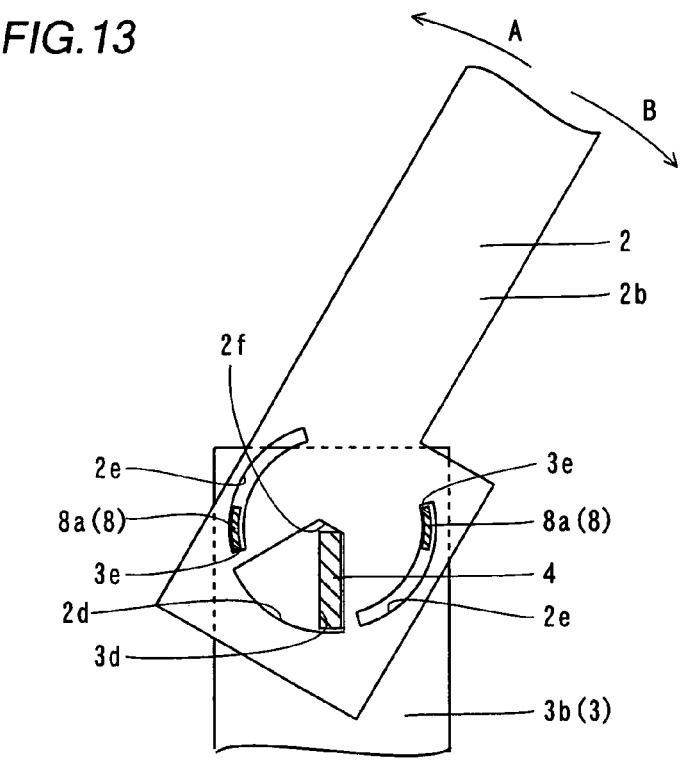

In order to incline the liquid crystal display portion support member 2 backward, on the other hand, the liquid crystal display portion 40 (see FIG. 1) supported by the liquid crystal display portion support member 2 is grasped and pressed in the direction B from the state upright with respect to the base support members 3 as shown in FIG. 11. Thus, the liquid crystal display portion support member 2 is rotated in the direction B about the bottom portion 2f of each sectoral hole 2d, as shown in FIG. 13. The liquid crystal display portion support member 2 is pressed and rotated in the direction B up to a prescribed angle of inclination, to be supported by the base support members 3 at this angle of inclination. According to this embodiment, the liquid crystal display portion support member 2 is rotatable (inclinable) up to an angle of inclination of 30° in the direction B so that each support shaft 4 comes into contact with a second end surface of the corresponding sectoral hole 2d, as shown in FIG. 13.

According to this embodiment, as hereinabove described, the display support mechanism 1 is provided with the plate-like support shafts 4 of sheet metal and the liquid crystal display portion support member 2 is rendered rotatable about the platelike support shafts 4 serving as the axes of rotation, whereby the platelike support shafts 4 can be employed as the axes of rotation. Thus, the liquid crystal display portion 40 can be inclined by a prescribed angle without employing round shafts as axes of rotation. In this case, the platelike support shafts 4 of sheet metal are so easily borable or shapable by press working that no complicated working of the axes of rotation is required dissimilarly to a case of performing grooving or the like along the outer peripheral surfaces of round shafts. Further, the holes 2d of the liquid crystal display portion support member 2 receiving the platelike support shafts 4 are provided in the form of sectors while the display portion support member 2 is rendered rotatable about the platelike support shafts 4 serving as the axes of rotation in the angular range (about 60° according to the embodiment) of the sectors, whereby the rotatable angular range of the display portion support member 2 can be regulated through the sectoral holes 2d without separately providing members for regulating the angular range.

According to this embodiment, the holes 2d of the liquid crystal display portion support member 2 are provided in the form of sectors while the holes 3d of the base support members 3 are provided in the form of rectangles for regulating rotation of the support shafts 4 so that the platelike support shafts 4 remain unsliding with respect to the base support members 3, to be inhibited from abrasion resulting from sliding.

According to this embodiment, the bottom portions 2f of the sectoral holes 2d receive the vertical load of the liquid crystal display portion 40 through the liquid crystal display portion support member 2, whereby the liquid crystal display portion support member 2 can be easily rotated about the bottom portions 2f of the sectoral holes 2d.

According to this embodiment, the display support mechanism 1 is provided with the plate springs 6 for pressing the liquid crystal display portion support member 2 and the base support members 3 to be rotatable about the platelike support shafts 4 serving as the axes of rotation, thereby supporting the liquid crystal display portion support member 2 (liquid crystal display portion 40) in a state inclined by a prescribed angle with respect to the base support members 3 (base 50) through the pressing force of the plate springs 6. Thus, the operation for inclining the display portion support member 2 (liquid crystal display screen 40) can be inhibited from complication dissimilarly to a case of fixing the display screen 40 to the base 50 by tightening screws while inclining the display screen 40 by a prescribed angle.

According to this embodiment, the display support mechanism 1 is provided with the stop members 5 for inhibiting the platelike support shafts 4 from coming off the liquid crystal display portion support member 2 and the base support members 3 through the pressing force of the plate springs 5, whereby the stop members 5 can easily hold the state of the plate springs 6 pressing the liquid crystal display portion support member 2 and the base support members 3.

According to this embodiment, the display support mechanism 1 is provided with the pressure-contact plates 8 inserted into the platelike support shafts 4 and arranged between the liquid crystal display portion support member 2 and the stop members 5 so that the stop members 5 remain unsliding with respect to the liquid crystal display portion support member 2, to be inhibited from abrasion.

According to this embodiment, the stop members 5 are provided in the form of plates and formed to receive the pressing force of the plate springs 5 on the strong end surfaces in the direction D perpendicular to the thickness direction, to be inhibited from bending resulting from the pressing force of the plate springs 6.

According to this embodiment, the stop members 5 are enabled to control the pressing force of the plate springs 6 pressing the liquid crystal display portion support member 2 and the base support members 3 against each other, whereby the force necessary for rotating the liquid crystal display portion support member 2 (liquid crystal display portion 40) with respect to the base support members 3 (base 3) against the pressing force of the plate springs 6 can be easily controlled.

According to this embodiment, the display support mechanism 1 is provided with the friction members 7 for increasing the frictional force between the liquid crystal display portion support member 2 and the base support members 3 so that the force necessary for rotating the liquid crystal display portion support member 2 (liquid crystal display portion 40) with respect to the base support members 3 (base 50) can be increased, thereby inhibiting the liquid crystal display portion 40 from moving with respect to the base 50 through weak force.

According to this embodiment, the length L4 of the bottom portions 2f is substantially equalized to the thickness T1 of the support shafts 4, whereby the support shafts 4 can be inhibited from positionally deviating from the bottom portions 2f of the sectoral holes 2d when the liquid crystal display portion support member 2 is rotated about the bottom portions 2f of the sectoral holes 2d. Thus, the operation of rotating the liquid crystal display portion support member 2 can be stabilized.

According to this embodiment, the radial length L5 of the sectoral holes 2d is rendered larger than the width W1 of the sides of the support shafts 4 corresponding to the length L5 of the holes 2d so that the support shafts 4 can be inhibited from coming into contact with arcuate sides of the holes 2d when rotated about the bottom portions 2f of the holes 2d, whereby the operation of rotating the liquid crystal display portion support member 2 can be stabilized.

Although the present invention has been described and illustrated in detail, it is clearly understood that the same is by way of illustration and example only and is not to be taken by way of limitation, the spirit and scope of the present invention being limited only by the terms of the appended claims.

For example, while the display support mechanism is provided on the liquid crystal display in the aforementioned embodiment, the present invention is not restricted to this but the display support mechanism may alternatively be provided on a display such as an organic EL display other than the liquid crystal display.

While the holes of the base support members are provided in the form of rectangles, the holes of the liquid crystal display portion support member are provided in the form of sectors and the bottom portions of the sectors are directed upward in the aforementioned embodiment, the present invention is not restricted to this but the holes of the liquid crystal display portion support member may alternatively be provided in the form of rectangles, the holes of the base support members may alternatively be provided in the form of sectors, and the bottom portions of the sectors may alternatively be directed downward. When the liquid crystal display portion support member is rotated with respect to the base support members in this case, the support shafts inserted into the rectangular holes of the liquid crystal display portion support member are rotated integrally with the liquid crystal display portion support member about the bottom portions of the sectoral holes of the base support members.

Figure 14:
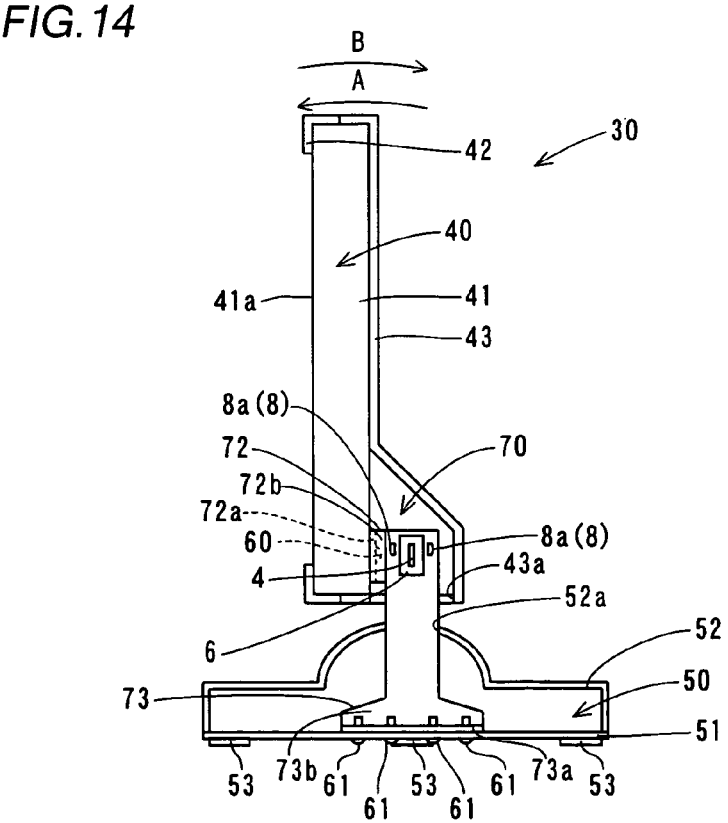
FIG. 14 is a side elevational view showing the overall structure of a liquid crystal display provided with a display support mechanism according to a first modification of the embodiment shown in FIG. 1.
Figure 15:
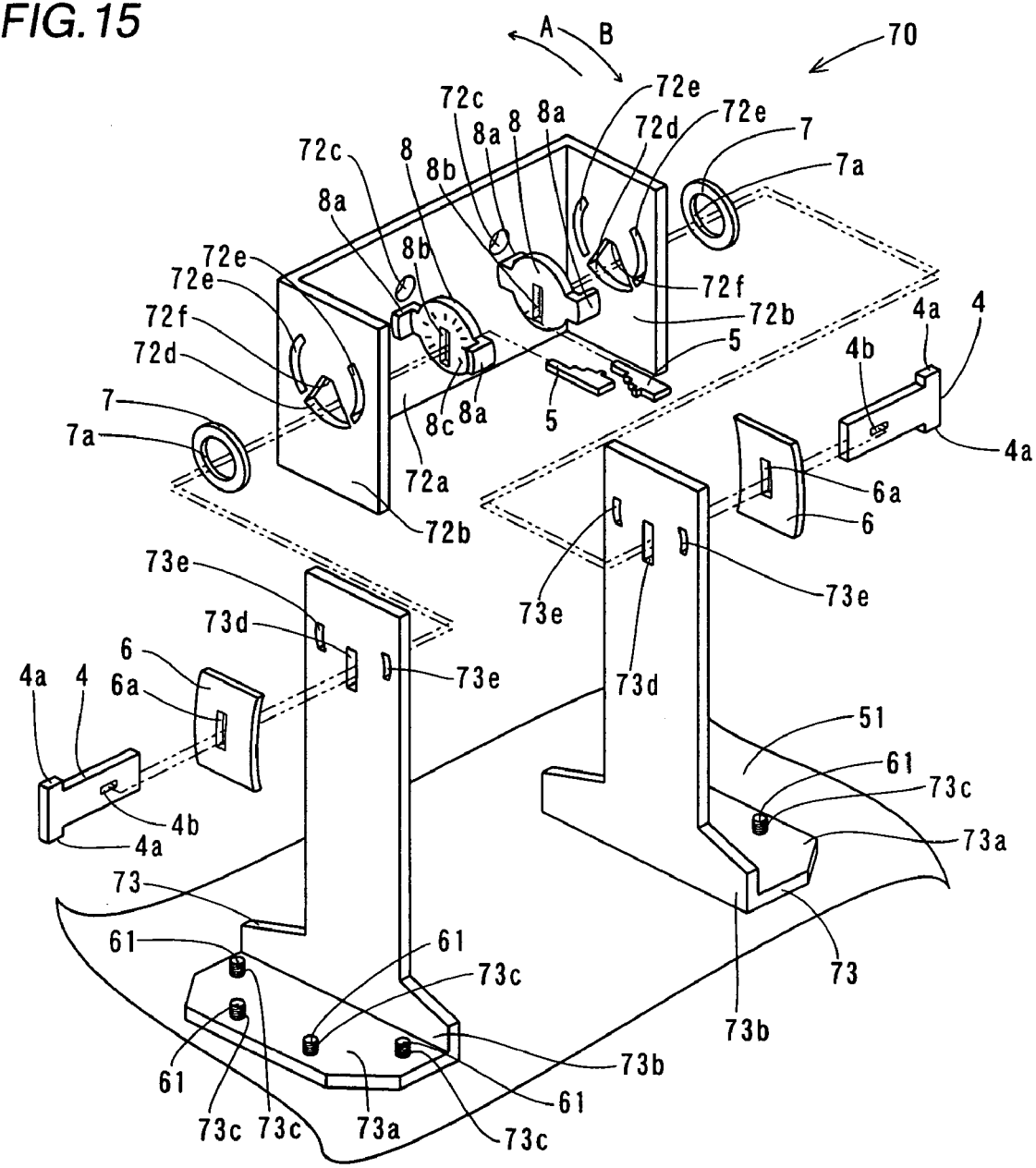
FIG. 15 is an exploded perspective view showing the overall structure of the display support mechanism according to the first modification shown in FIG. 14.

While the center of rotation of the liquid crystal display portion support member 2 is provided in the base 50 in the aforementioned embodiment, the present invention is not restricted to this but the center of rotation of a liquid crystal display portion support member 72 may be provided in a liquid crystal display portion 40 as in a display support mechanism 70 according to a first modification of the aforementioned embodiment shown in FIGS. 14 and 15. More specifically, the display support mechanism 70 according to the first modification comprises the liquid crystal display portion support member 72 arranged in the liquid crystal display portion 40 and base support members 73 protruding upward from a notch 52a of the base 50. The liquid crystal display portion support member 72 is constituted of a display mounting portion 72a formed with screw receiving holes 72c and a pair of rotational portions 72b formed with sectoral holes 72d having bottom portions 72f and arcuate holes 72e respectively. The base support members 73 are constituted of base mounting portions 73a formed with screw receiving holes 73c and rotational portion mounting portions 73b formed with rectangular holes 73d and arcuate holes 73e. In this case, the rotational portion mounting portions 73b of the base support members 73 are so provided as to extend upward through the notch 52a while the rectangular holes 73d and the arcuate holes 73e are provided in the vicinity of the upper ends so that these holes 73d and 73e are arranged in the liquid crystal display portion 40.

Figure 16:
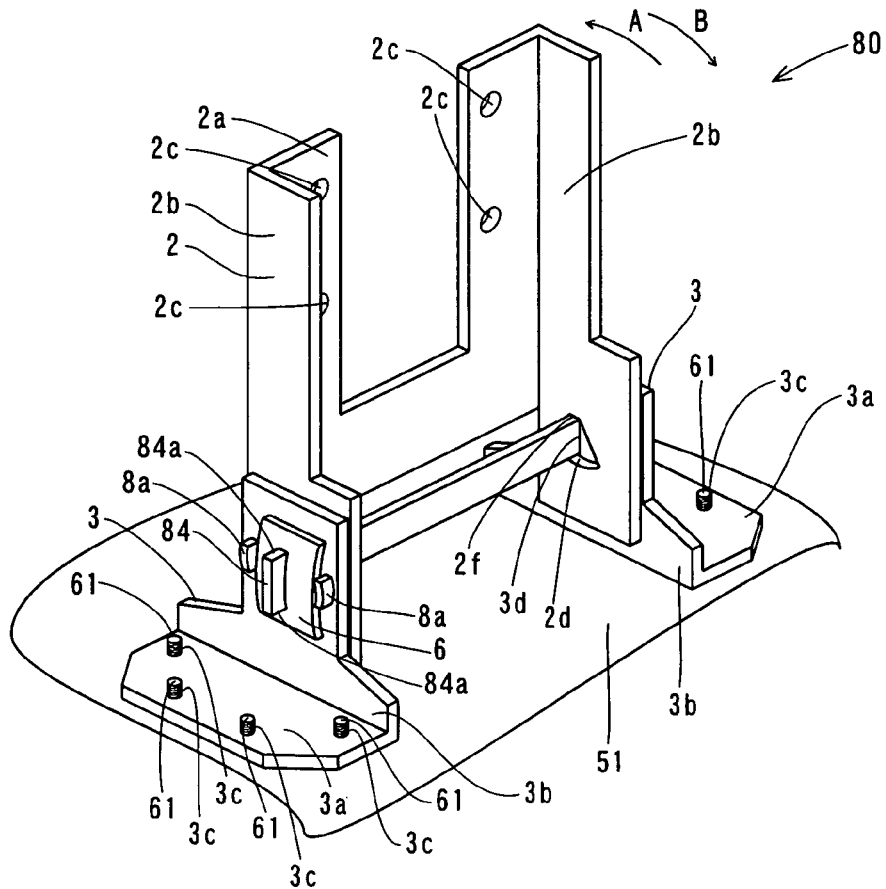
FIG. 16 is a perspective view showing the overall structure of a display support mechanism according to a second modification of the embodiment shown in FIG. 1.

While the support shafts 4, the stop members 5, the plate springs 6, the friction members 7 and the pressure-contact plates 8 are provided for the pair of base support members 3 and the pair of rotational portions 2b of the liquid crystal display portion support member 2 respectively in the aforementioned embodiment, the present invention is not restricted to this but a support shaft 84 having a contact portion 84*a*, a stop member 5, a plate spring 6, a friction member 7 and a pressure-contact plate 8 may alternatively be provided only for the first one of a pair of base support members 3 and the first one of a pair of rotational portions 2*b* of a liquid crystal display portion support member 2 as in a display support mechanism 80 according to a second modification of the aforementioned embodiment shown in FIG. 16. In this case, the support shaft 84 is so formed as to extend toward and enter a rectangular hole 3*d* of the second base support member 3 and a sectoral hole 2*d* of a second rotational portion 2*b* of the liquid crystal display portion support member 2.

Figure 17:
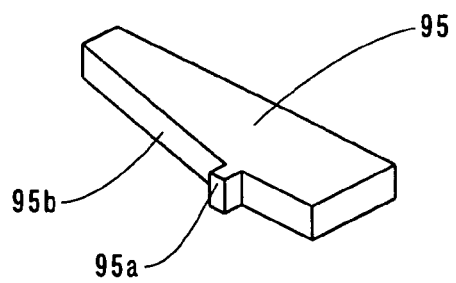
FIG. 17 is a perspective view showing a stop member of a display support mechanism according to a third modification of the embodiment shown in FIG. 5.

While the stop members 5 are provided with the engaging portions 5*b* and 5*c* for controlling the pressing force for pressing the liquid crystal display portion support member 2 and the base support members 3 with the plate springs 6 and the stop members 5 in the aforementioned embodiment, the present invention is not restricted to this but a contact portion 95*a* and an inclined portion 95*b* may alternatively be provided on a first side surface of each stop member 95 for controlling pressing force for pressing a liquid crystal display portion support member 2 and a corresponding base support member 3 with a corresponding plate spring 6 and the inclined portion 95*b* of the stop member 95 as in a third modification of the aforementioned embodiment shown in FIG. 17.

What is claimed is:

1. A display support mechanism comprising:
   a support shaft made of a plate;
   a display screen side support member, having a first hole receiving said support shaft made of a plate, provided on a side of a display screen; and
   a base side support member, having a second hole receiving said support shaft made of a plate, provided on a side of a base;
   a spring member for pressing said display screen side support member and said base side support member to be rotatable about said support shaft made of a plate serving as an axis of rotation, the spring member including a plate spring; and
   a stop member for inhibiting said support shaft made of a plate from coming off said display screen side support member and said base side support member through the pressing force of said spring member,
   wherein at least either said first hole or said second hole receiving said support shaft made of a plate is provided in the form of a sector while said display screen side support member is rotatable about said support shaft made of a plate serving as an axis of rotation in the angular range from a position that said support shaft made of a plate comes into contact with a first end surface of said sector to a position that said support shaft made of a plate comes into contact with a second end surface of said sector.

2. The display support mechanism according to claim 1, wherein
   either said first hole or said second hole is provided in the form of said sector while either said second hole or said first hole is provided in the form of a rectangle for regulating rotation of said support shaft made of a plate.

3. The display support mechanism according to claim 1, wherein
   the bottom of said sector receives the vertical load of said display screen through said display screen side support member.

4. The display support mechanism according to claim 3, wherein
   the length of said bottom is substantially equalized to the thickness of said support shaft.

5. The display support mechanism according to claim 3, wherein
   the radial length of said sector is larger than the width of a side of said support shaft made of a plate corresponding to the radial width of said sector when at least either said first hole or said second hole is provided in the form of said sector.

6. The display support mechanism according to claim 1, further comprising a plate member inserted into said support shaft made of a plate and arranged between said display screen side support member or said base side support member and said stop member.

7. The display support mechanism according to claim 1, wherein
   said stop member is made of a plate and receives the pressing force of said spring member on an end surface in a direction perpendicular to a thickness direction of said stop member.

8. The display support mechanism according to claim 1, wherein
   said stop member can control the pressing force of said spring member pressing said display screen side support member and said base side support member against each other.

9. The display support mechanism according to claim 1, further comprising a friction member for increasing frictional force between said display screen side support member and said base side support member.

10. The display support mechanism according to claim 9, wherein
    said friction member is arranged to annularly enclose said support shaft.

11. The display support mechanism according to claim 1, wherein
    said support shaft is made of sheet metal.

12. A display support mechanism comprising a display screen side support member provided on a side of a display screen and a base side support member provided on a side of a base,
    further comprising a support shaft made of a plate, a spring member for pressing said display screen side support member and said base side support member to be rotatable about said support shaft made of a plate serving as an axis of rotation, a stop member for inhibiting said support shaft made of a plate from coming off said display screen side support member and said base side support member through the pressing force of said spring member, a plate member inserted into said support shaft made of a plate and arranged between said display screen side support member and said stop member and a friction member for increasing frictional force between said display screen side support member and said base side support member, wherein
    said display screen side support member includes a first hole provided in the form of a sector for receiving said support shaft made of a plate and is rotatable about said support shaft made of a plate serving as an axis of rotation in the angular range of said sector, said base side support member includes a second hole, receiving said support shaft made of a plate, provided in the form of a rectangle for regulating rotation of said support shaft made of a plate, the bottom of said sector receives the vertical load of said display screen through display screen side support member, and said stop member is made of a plate, receives the pressing force of said spring member on an end surface in a direction perpendicular to the thickness direction and can control the pressing force of said spring member pressing said display screen side support member and said base side support member against each other.

13. The display support mechanism according to claim 12, wherein the length of said bottom is substantially equalized to the thickness of said support shaft.

14. The display support mechanism according to claim 12, wherein the radial length of said sectoral first hole is larger than the length of a side of said support shaft corresponding to the radial width of said first hole.

15. The display support mechanism according to claim 12, wherein said spring member includes a plate spring.

16. The display support mechanism according to claim 12, wherein said friction member is arranged to annularly enclose said support shaft.

17. The display support mechanism according to claim 12, wherein said support shaft is made of sheet metal.

* * * * *